3,838,075
PROCESS FOR THE PRODUCTION OF HYDROPHILIC FOAM PLASTICS

Werner Dietrich, Helmut Reiff, Karlheinz Andres, and Johannes Niggemann, Cologne, and Ernst Roos, Leverkusen, Germany, assignors to Bayer Aktiengesellschaft, Leverkusen, Germany
No Drawing. Filed Feb. 12, 1973, Ser. No. 331,936
Claims priority, application Germany, Feb. 17, 1972, P 22 07 361.6
Int. Cl. C08g 22/16, 22/44
U.S. Cl. 260—2.5 AD                6 Claims

ABSTRACT OF THE DISCLOSURE

Hydrophilic polyurethane foams well-suited for use as substrate for the propagation and cultivation of plants are prepared by the isocyanate polyaddition process by reacting a polyisocyanate with compounds containing at least two hydrogen atoms reactive with —NCO groups wherein from about 5% to about 100% by weight based on the weight of active hydrogen containing compound of a betaine is incorporated in the reaction mixture, said betaine containing at least one group that is reactive with —NCO groups.

---

This invention relates to polyurethane foam plastics and more particularly to hydrophilic polyurethane foam plastics and a process for the preparation thereof.

The production of polyurethane foam plastics from polyols and polyisocyanates in the presence of water and/or other blowing agents, activators, stabilizers and various auxiliary substances is well-known.

Foam plastics having a density of from 6 to about 20 kg./m.$^3$ can easily be obtained by this process if high concentrations of water and, if desired, additional quantities of low boiling organic solvents such as monofluorotrichloromethane are used as blowing agent.

It is also known to use synthetic foams as plant substrates. For this purpose, it is preferred to use foam plastics which are sufficiently hydrophilic to insure an adequate supply of moisture to the roots.

One fundamental problem of using synthetic plant substrates is that of imparting to them the buffering function inherent in natural and garden soils to compensate for the fluctuations in pH of the water used for spraying the plants.

It has now been found that a very efficient pH buffering capacity can be imparted to hydrophilic polyurethane foams by incorporating therein betaines which contain at least one group which is reactive with isocyanates. The proportion of these betaines used is between about 5% and 100% by weight, preferably from about 10% to about 30% by weight, based on the total quantity of compounds which contain active hydrogen atoms.

According to one particular embodiment of the process of the invention, the betaines are added in the form of solutions in water which at the same time serves as a blowing agent by the conventional reaction with isocyanates to produce carbon dioxide.

Furthermore, if the foam plastics are intended for use as synthetic plant substrates, it is advantageous to mix nutrient salts, either as aqueous solutions or as pastes, with the starting materials, e.g., with the polyols used, or to add them to the reaction mixture either just before or during the foaming process.

These polyurethane foams are very stable in statu nascendi and can be produced with all gradations of cell sizes in the final product from fine to coarse. All the other properties of the foam plastics used as plant substrates, such as their open cell structure, low density (6 to 50 kg./m.$^3$, preferably 10 to 20 kg./m.$^3$) and high water uptake and retention capacity are preserved or even improved.

According to another embodiment of carrying out the process of the invention, the cross-linking agent which contains betaine groups is first added to a reaction mixture which is free from nutrient salts and the aqueous nutrient salt solutions are only subsequently added to the completed foam.

This invention thus relates to a process for the production of hydrophilic polyurethane foams which have a density of from about 6 to about 50 kg./m.$^3$, preferably from about 10 to about 20 kg./m.$^3$, comprising reacting compounds which contain at least two active hydrogen atoms and have a molecular weight of 100 to 7000 with polyisocyanates and water and/or other blowing agents, if desired, in the presence of activators and foam stabilizers and, if desired, other foaming agents wherein a betaine which also contains at least one group which is reactive with isocyanates is used in an amount of from about 5% to about 100% by weight, preferably from about 10% to about 30% by weight, based on the weight of compounds with a molecular weight of from about 100 to about 7000 which contain at least two active hydrogen atoms, and a ratio of NCO groups to active hydrogen atoms of between about 2:100 and 90:100, preferably from about 25:100 to about 60:100, is maintained.

According to a preferred embodiment of the process, the betaines which contain active hydrogen atoms are used in quantities of from about 10% to about 90% by weight, preferably from about 40% to about 80% by weight, based on the compound which contains at least two active hydrogen atoms, and dissolved in the water used as a blowing agent.

The betaines used according to the invention are known per se. They preferably have a molecular weight of less than about 800 and in many cases less than about 500.

The following betaines are preferred for use in the process of the invention:

1. Aliphatic, cycloaliphatic, aromatic and heterocyclic mono- and diaminocarboxylic acids, some examples of which are: glycine, α- and β-alanine, 6-aminocaproic acid, 4-aminobutyric acid, sarcosine, methionine, leucine, isoleucine, serine, valine, ornithine, histidine, lysine, proline, phenylalanine, threonine, cysteine, asparagine, glutamine, arginine, aspartic acid, glutamic acid, oxaluric acid, anilido acetic acid, anthranilic acid, 2-ethylaminobenzoic acid, 3-aminobenzoic acid, 4-aminobenzoic acid, N-phenylaminoacetic acid, 3,4-diaminobenzoic acid, 5-aminobenzenedicarboxylic acid, β-aminoethyl-β-alanine, ω-aminohexyl-β-alanine and the like.

2. Aliphatic, cycloaliphatic, aromatic and heterocyclic mono-, di- or polyaminosulphonic acids or disulphonic acids, some examples of which are: amidosulphonic acid, hydroxylamine monosulphonic acid, hydrazine disulphonic acid, sulphanilic acid, N-phenylaminomethanesulphonic acid, 4,6 - dichloroanilinesulphonic acid-(2), phenylenediamine-(1,3)-disulphonic acid-(4,6), N-acetyl-naphthylamine - (1)-sulphonic acid-(3), naphthylamine-(1) - sulphonic acid, naphthylamine-(2)-sulphonic acid, naphthylamine - disulphonic acid, naphthylamine-trisulphonic acid, 4,4' - di-(p-aminobenzoylamino)-diphenylurea - disulphonic acid - (3,3'), phenyl-hydrazine-disulphonic acid - (2,5), 2,3-di-methyl-4-aminoazobenzene-disulphonic acid-(4',5), 4'-aminostilbene-disulphonic acid-(2,2')-4-azo-4-anisole, carbazole-disulphonic acid-(2,7), taurine, methyltaurine, butyltaurine, 3-aminobenzoic acid-(1) - sulphonic acid-(5), 3-aminotoluene-N-methanesulphonic acid, 6 - nitro-1,3-dimethylbenzene-4-sulphamic acid, 4,6 - diaminobenzene-disulphonic acid-(1,3), 2,4-diaminotoluene-sulphonic acid-(5), 4,4'-diaminodiphenyl-disulphonic acid - (2,2'), 2-aminophenol-sulphonic acid- (4), 4,4'-diaminodiphenylether-sulphonic acid-(2), 2-aminoanisole - N-methanesulphonic acid, 2-aminodiphenylamine-sulphonic acid, 2,4-diaminobenzene-sulphonic acid and the like.

3. The aminocarboxylic, aminosulphonic, polyaminocarboxylic and polyaminosulphonic acids also include the addition products (optionally saponified) of unsaturated acids, some examples of which are:

Acrylic acid and methacrylic acid and unsaturated nitriles such as acrylonitrile, of cyclic dicarboxylic acid anhydrides such as maleic, phthalic or succinic acid anhydride. of sulphocarboxylic acid anhydrides such as sulphoacetic acid or o-sulphobenzoic acid anhydride, of lactones such as β-propiolactone or β-butyrolactone, the addition products of the reaction products of olefines with sulphur trioxide such as carbyl sulphate, of epoxycarboxylic or epoxysulphonic acids such as glycidic acid or 2,3-epoxy-propanesulphonic acid, of sultones such as 1,3-propanesultone, 1,4 - butanesultone, or 1,8 - naphthylsultone and of disulphonic acid anhydrides such as benzene - 1,2 - disulphonic acid anhydride with aliphatic and aromatic amines such as ethylene - 1,2 - diamine, hexamethylene - 1,6 - diamine, the isomeric phenylenediamines, diethylene triamine, triethylenetetramine, tetraethylenepentamine, pentaethylene hexamine, optionally alkylated hydrazines, ammonia, amino - alcohols, hydroxyalkylated amines and hydrazines such as ethanolmine, diethanolamine, triethanolamine, ethanol ethylenediamine or ethanolhydrazine, alcohols such as ethylene glycol, propylene - 1,3 - glycol, butane - 1,4 - diol, hexane - 1,6 - diol and polyhydric alcohols such as trimethylolpropane, glycerol and hexanetriol; the addition products (optionally hydrogenated) of epoxy and ethyleneimine compounds such as ethylene oxide, propylene oxide, butylene oxide, styrene oxide and ethylene imine and of unsaturated nitriles such as acrylonitrile with aliphatic and aromatic aminocarboxylic acids and aminosulphonic acids; the reaction products of hydroxyalkanesulphonic acids, halocarboxylic acids and of halosulphonic acids with optionally alkylated hydrazines such as hydrazinoacetic acid, hydrazinoethanesulphonic acid and hydrazinomethanesulphonic acid; the saponified addition products of cyanhydrins with hydrazines, such as 1,2-hydrazine-bis-isobutyric acid and oleyldiethanolamine as well as polyfunctional polyamines in which the individual amino groups may differ from each other in their basicity. e.g., the polyamines obtained by hydrogenation of addition products of acrylonitrile with primary and secondary amines, peralkylated or partly alkylated polyamines such as N,N-dimethyl-ethylenediamine; compounds such as α-aminopyridine and N,N-dimethylhydrazine; the addition products of sodium bisulphite with olefinically unsaturated compounds such as allyl alcohol, methyl alcohol, ethyl allyl alcohol and the like, maleic acid, bis-ethyleneglycol maleate and bispropylene glycol maleate.

4. Hydrazinocarboxylic acids, in particular, hydrainodicarboxylic acids.

The betaines particularly preferred are the betaines obtained by ring opening of propanesultone or butanesultone, 1,8-naphthylsultone or propiolactone and its alkyl homologues with diethanolamine, diisopropanolamine, N-methyldiethanolamine, N-butyl-diethanolamine, 2-N-dimethylaminomethyl-2-ethyl - (1,3) - propanediol, 2-N-dimethylaminomethyl-2-methyl-(1,3) - propanediol, N-phenyl-diethanolamine, N - p - tolyl - diethanolamine, N-cyclohexyl - diethanolamine, N - stearyl - diethanolamine, N-oleyl-diethanolamine and N-methyl - diisopropanolamine; the products of ring opening of the above sultones and lactones with triethanolamine, aminoethanol, aminopropanol, N - methylaminoethanol, N-methylaminopropanol, N,N-dimethylaminoethanol, N,N-dimethylaminopropanol, etc. These ring opening products not only constitute extremely water-soluble betaines so that they can be dissolved in the water used for foaming but also in some cases have low melting points and are readily soluble in the polyols used for foaming. Other betaines which are also preferred are the reaction products of aminocarboxylic acids and aminosulphonic acids with ethylene oxide, propylene oxide or butylene oxide, e.g., N-bis-hydroxyethyl-taurine, N-bis-hydroxy-ethyl-α-alanine and N-bis-hydroxyethyl-β-alanine.

According to the invention, the betaines containing active hydrogen atoms are advantageously dissolved in quantities of 10 to 90% by weight, preferably 40 to 80% by weight, based on the compound which contains at least 2 active hydrogen atoms, in the compounds with active hydrogen atoms which react with isocyanates.

According to the invention, it is preferred to use those betaines which correspond to the formula I:

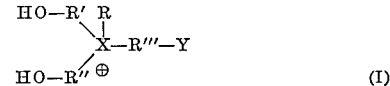

(I)

wherein

R represents a hydrogen atom, $C_1$–$C_{18}$ alkyl radicals, $C_4$–$C_{14}$ cycloalkyl radicals, $C_7$–$C_{20}$ aralkyl radicals or $C_6$–$C_{14}$ aryl radicals;

R' R" and R'" represent the same or different divalent $C_2$–$C_{12}$ alkylene radicals, $C_4$–$C_{14}$ cycloalkylene radicals or $C_7$–$C_{20}$ aralkylene radicals, any of which radicals may be interrupted by ether oxygen atoms;

X represents N or P; and

Y represents

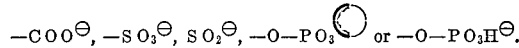

The radicals R, R', R" and R'" may also be substituted with halogen atoms, preferably chlorine atoms, or alkyl radicals, preferably methyl or ethyl radicals or alkoxy radicals or nitro groups.

Compounds of the general formula I are capable of accepting protons in accordance with equation II or OH⁻ ions in accordance with equation III and thus have a buffering action in the foam substrates:

(II) 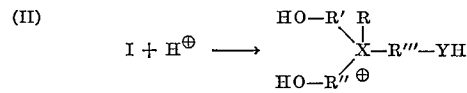

(III) 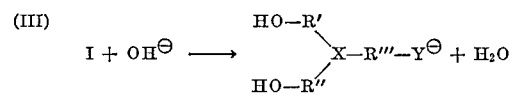

when R=H.

According to the invention, known plant nutrient salts may be added to the foamable reaction mixture, e.g., inorganic compounds of nitrogen, phosphorus, sulphur, calcium, potassium and magnesium, and trace elements such as salts of iron, manganese, zinc, nickel, copper chlorine, boron and molybdenum.

According to the invention, the plant nutrient salts are advantageously added to the foam reaction mixture in quantities of from about 1% to about 30% by weight, preferably from about 2% to about 20% by weight, either by dissolving them in the water used as blowing agent or making them up into a paste with the starting materials or by adding them as such either just before or during the foaming process.

Plant protective agents, plant hormones and growth substances may of course, also be added.

The known aliphatic, cycloaliphatic, araliphatic and aromatic polyisocyanates may be used as starting components for carrying out the process of the invention, for example, tetramethylene-1,4-diisocyanate, hexamethylene-1,6-diisocyanate, dodecane-1,12-diisocyanate, cyclohexane-1,3- and -1,4-diisocyanate and any mixtures of these isomers, 1-isocyanato-3,3,5-trimethyl-5-isocyanatomethyl cyclohexane, phenylene-1,3- and -1,4-diisocyanate, tolylene-2,4- and -2,6-diisocyanate and any mixtures of these isomers, hexahydrotolylene-2,4- and -2,6-diisocyanate and any mixtures of these isomers, diphenylmethane-4,4'-diisocyanate, naphthylene-1,5-diisocyanate, methylene poly lyc' triphenylmethane-4,4',4''-triisocyanate, polyphenyl-polymethylene polyisocyanates such as may be obtained by the condensation of aniline and formaldehyde followed by phosgenation, polyisocyanates containing carbodiimide-isocyanate adducts, which may be prepared according to German Patent Specification No. 1,092,007, the diisocyanates described in United States Patent Specification No. 3,492,330, polyisocyanates which contain allophanate groups as described in British Patent Specification No. 994,890, Belgian Patent Specification No. 761,626 and published Dutch Patent Application No. 7,-102,524, isocyanurate polyisocyanates as described in German Patent Specification Nos. 1,022,789 and 1,027,-394 and in German Offenlegungsschrift Nos. 1,929,034 and 2,004,048, biuret polyisocyanates as described in German Patent Specification No. 1,101,394, British Patent Specification No. 889,050 and French Patent Specification No. 7,017,514, polyisocyanates prepared by telomerization reactions as described in Belgian Patent Specification No. 723,640, polyisocyanates which contain ester groups in accordance with British Patent Specification Nos. 956,474 and 1,072,956, the aliphatic, cycloaliphatic, araliphatic or aromatic polyisocyanates mentioned by W. Siefken in Justus Liebig's Annalen der Chemie, 562, pages 75 to 136, and reaction products of the above mentioned isocyanates with acetals according to German Patent Specification No.1,072,385 as mentioned in German Patent Specification Nos. 1,022,789 and 1,027,394. Any mixtures of the above mentioned polyisocyanates may, of course, also be used.

Generally it is preferred to use commercially readily available polyisocyanates such as tolylene-2,4- and -2,6-diisocyanate and any mixtures of these isomers or polyphenylpolymethylene polyisocyanates which may be obtained by aniline-formaldehyde condensation followed by phosgenation.

It is also preferred to use polyisocyanates in which from about 1% to about 45% of the NCO groups present have already been reacted with compounds which contain at least one active hydrogen atoms. The following are mentioned as examples: Solutions of polyisocyanates which contain urethane, allophanate and urea groups in monomeric diisocyanates, and solutions of polyisocyanates which contain isocyanurate, carbodiimide, uretdione imine and uretdione groups in monomeric diisocyanates.

It is particularly preferred to use solutions of biuret polyisocyanates in monomeric isocyanates which are free from biuret groups which may be prepared in known manner, e.g., by the process according to German Pats. No. 1,101,394; 1,110,859; 1,165,580; 1,215,365; 1,230,778; 1,-229,067; 1,227,003; 1,227,004; 1,174,759; and 1,174,760 and Belgian Pat. No. 721,031. It is advantageous to empoly the method of preparation described in German Offenlegungsschrift No. 1,924,302, according to which diisocyanates and polyisocyanates are reacted with water with the aid of an emulsifier which process is generally carried out as follows: 0.1 to 2 parts by weight (based on 100 parts by weight of isocyanate) of a non-ionogenic emulsifier, e.g., a ricinic polyethylene glycol ether with OH number 50, are added to the isocyanate with stirring, the calculated quantity of water is then added dropwise at 60 to 95° C. with stirring and the resulting suspension is heated at 150 to 170° C. for 1 to 3 hours. Homogenous polyisocyanate mixtures with elevated NCO functionality and elevated viscosity which are stable in storage are obtained by this process.

Biuret polyisocyanates may also prepared by reacting the given diisocyanates and polyisocyanates with certain amines such as secondary mono-, di- and polyamines or aromatic diamines which have an attenuated nucleophilic character such as, for example, the methyl ester of 3,5-diamino-4-chlorobenzoic acid and the like.

The modified polyisocyanates which are preferably used, i.e., polyisocyanates which contain urethane groups, allophanate groups, biuret groups, isocyanurate groups or uretdioneimine groups, have the advantage over unmodified isocyanates of having a greater affinity both for hydrophilic polyether polyols, especially those polyether polyols which have been prepared using ethylene oxide attached to suitable starting media, and for water which is used as blowing agent.

In addition to the reaction with betaines, the polyisocyanates are reacted with compounds which contain at least two active hydrogen atoms and have a molecular weight of from about 100 to about 7,000, in particular, those known compounds with molecular weights of 100 to 7,000, preferably 1,000 to 5,000, which contain hydroxyl and/or carboxyl groups, such as for example, hydroxyl-containing polyesters, polyethers, polythioethers, polyacetals, polycarbonates and polyester amides. The hydroxyl polyesters may, for example, be reaction products of polyhydric alcohols with polybasic carboxylic acids of the kind used in technology. Instead of free carboxylic acids, however, the corresponding polycarboxylic acid anhydrides, polycarboxylic acid esters or mixtures of these compounds may be used for preparing the hydroxyl polyesters. The polycarboxylic acids may be aliphatic, cycloaliphatic, aromatic or heterocyclic compounds and may be substituted and/or unsaturated. The following are mentioned as specific examples: Succinic acid, adipic acid, sebacic acid, phthalic acid, isophthalic acid, phthalic acid anhydride, maleic acid, maleic acid anhydride, monomeric, dimeric and trimeric fatty acids, dimethyl terephthalate, etc. The following are examples of suitable polyol components: Ethylene glycol, propylene-1,3-glycol, butylene-1,4-glycol, butylene-2,3-glycol, glycerol, trimethylolpropane, trimethylolethane, hexane-1,2,6-triol, butane-1,2,4-triol, pentaerythritol, mannitol, sorbitol and methyl glycoside as well as polyethylene glycols, polypropylene glycols and polybutylene glycols. Polyesters with terminal carboxyl groups are also suitable for the reaction with polyisocyanates according to the invention.

The hydroxypolyethers used are known per se and are prepared e.g., by the polymerization of epoxides such as ethylene oxide, propylene oxide, butylene oxide styrene oxide or epichlorohydrin, optionally on starting components which contain reactive hydrogen atoms such as alcohols or amines, e.g., glycerol, trimethylolpropane, ethylene glycol, ammonia, ethanolamine or ethylene diamine. Sucrose polyethers may also be used.

Examples of suitable polyhydroxyl and polycarbonyl compounds have been described, e.g., in Saunders and Frisch "Polyurethanes, Chemistry and Technology," Volumes I and II, Interscience Publishers 1962 and 1964 (page 32 et seq. Volume I and page 5 and page 198 et seq. Volume II) and in Kunststoff-Handbuch, Volume VII, Vieweg-Hochtlen, Carl-Hanser-Verlag, Munich, 1966, e.g., on pages 45 to 71. Epoxy resins which contain active hydrogen atoms, hydrogenation products of copolymers of olefins and carbon monoxide, phenol formaldehyde resins which have been reacted with alkylene oxides and urea formaldehyde resins reacted with alkylene oxides may also be used. A certain amount of low molecular weight polyhydroxyl compounds with a molecular weight of 62 to 100 may also be included, for example, chain lengthening agents such as glycols, diamines, aldimines and ketimines.

The reaction of the polyisocyanate with the compounds which contain at least two active hydrogen atoms including water which may be used as blowing agent is carried out with a ratio of NCO to active hydrogen of between 20:100 and 90:100 preferably between 25:100 and 65:100 since the foams obtained in this way are exceptionally hydrophilic. These ratios do not include acidic hydrogens such as those of carboxylic acid resp. sulfonic acid groups which may be present in the reaction mixture.

Organic blowing agents may also be used as well as water, such as alkanes, haloalkanes or low boiling solvents in general, some specific examples of which are methylene chloride, monofluorotrichloromethane, difluorodichloromethane, acetone and methylformate and the like. The blowing agents used may also be compounds which liberate gases at elevated temperatures, such as azo compounds or diurethanes of bissemiacetals, e.g., that obtained from 2 mols of formaldehyde and 1 mol of ethylene glycol. Flame retarding substances may also be added to the foaming mixtures.

The activators used may be those commonly used for the production of polymethane foams, e.g., tertiary amines such as triethylamine, dimethylbenzylamine, tetramethyl ethylene diamine, N-alkylmorpholines, endoethylenepiperazine and 2,4,6-dimethylaminomethylphenol or organic metal salts such as tin-(II) acylates, e.g., tin-(II) salts of 2-ethylene caproic acid, dialkyl tin-(IV) acylates such as dibutyl tin dilaurate or acetyl acetonates of heavy metals, e.g., of iron.

The emulsifiers used may be e.g., hydroxyethylated phenols, higher sulphonic acids, sulphonated castor oil, hydroxyethylated castor oil, sulphonated ricinoleic acid or ammonium salts of oleic acid. The foam stabilizers may be for example, those based on polysiloxane-polyalkylene glycol copolymers or basic silicone oils. Other suitable emulsifiers, catalysts and additives are mentioned in "Polyurethanes, Chemistry and Technology," Volumes I and II, Saunders and Frisch, Interscience Publishers, 1962 and 1964.

The treatment of the foam itself is carried out by known processes at room temperature or elevated temperatures by simply mixing the polyisocyanate combinations with the compounds which contain hydroxyl and/or carboxylic groups and adding the additives and auxiliary substances described above. It is advantageous to use mechanical apparatus for this process such as those described in French Patent Specification No. 1,074,713 in which case the aqueous solution which contains the cross-linking agent with betaine groups and optionally nutrient salts, the polyhydroxyl component and the polyisocyanate should be delivered separately into a mixing chamber.

According to the invention, the foam plastics obtained are eminently suited for use as substrates in the vegetative and generative propagation of plants.

The foam substrate elements may be produced in the form of cubes, strands, panels or other shapes which have a very high buffering capacity, which is very important in horticulture owing to the frequently wide fluctuations in the pH of the water used for spraying the plants. A certain reserve of fertilizer which is slowly released may be supplied to these elements by adding salts to the foaming mixture. Such foam plastic elements are used mainly for the generative and vegetative propagation of plants. The hydrophilic foams produced may be either hard or soft, open-celled or closed-cell. According to the invention, elastic, compressible foam plastic elements with a network structure which are compressed with a solution of adhesive, for example, e.g., alginates after deposition of seed in them and used as seed depots suitable for planting out may be supplied with an optimum reserve of nutrients and the like which insures very healthy development of individual plants even under extreme environmental conditions substantially without additional use of fertilizers. Flakes or other particles of foam plastics produced by the process according to the invention (preferably hydrophobic foams) used alone or in combination with humus substrates (mainly peat) are capable of serving as not only physical soil improvers but also as depot fertilizers in garden soil. Flakes or other particles (cubes, cushions, etc.) may, of course, also be used quite generally for physical and chemical soil improvement in open land.

In that case, the hydrophilic foams are preferably used for improving light, sandy soils.

The invention is further illustrated but it is not intended that it be limited by the following examples wherein all parts and percentages are by weight unless otherwise indicated.

EXAMPLE 1

A foam is prepared from the following composition:

About 15 parts of a polyether of propylene oxide initiated on ammonia (OH number 590), about 5 parts of a polyether of propylene oxide initiated on ethylene diamine (OH number 470), about 5 parts of a polyether of propylene oxide initiated on 1,1,1-trimethylolpropane (OH number 375), about 5 parts of a polyether of ethylene oxide and propylene oxide (20:80% by weight) initiated on 1,1,1-trimethylolpropane (OH number 42), about 10 parts of a polyester of adipic acid, phthalic acid, glycerol and 1,1,1-trimethylolpropane (OH number 380), about 5 parts of 1,1,1-trimethylolpropane (OH number 1260), about 10 parts of diethylene glycol (OH number 1060), about 1.5 parts of a hydroxyethylated oleic acid amide, about 1.5 parts of a polysiloxane stabilizer, about 0.3 part of N,N-dimethylbenzylamine, about 12 parts of a solution of amidosulphonic acid in water (1:5) and about 80 parts of a polyphenylpolymethylene polyisocyanate prepared by aniline-formaldehyde condensation followed by phosgenation (NCO content 31%).

The density of the foam is about 11.6 kg./m.$^3$.

EXAMPLE 2

A foam is prepared from the following composition:

About 20 parts of a polyether of propylene oxide started on ethylene diamine (OH number 630), about 20 parts of a polyether of propylene oxide started on 1,1,1-trimethylolpropane (OH number 375), about 15 parts of a polyether of ethylene oxide and propylene oxide (20:80), (OH number 42), about 10 parts of diethylene glycol (OH number 1060), about 2 parts of a polysiloxane stabilizer, about 15 parts of a solution of ε-aminocaproic acid in water (1:2), about 10 parts of monofluorotrichloromethane and about 74 parts of a biuretized polyisocyanate prepared from tolylene-2,4- and -2,6-diisocyanate (80:20% by weight), and having an NCO content of about 32.5%.

The density of the foam is about 15.4 kg./m.$^3$.

EXAMPLE 3

A foam is prepared in the same way as in Example 2, except that the betaine cross-linking agent used consists of about 10 parts by weight of the compound

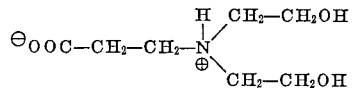

dissolved in about 22 parts by weight of water. The density of the foam is about 14.2 kg./m.$^3$.

In another reaction mixture, about 7 parts of a salt mixture of the following composition was foamed in with the other components:

| | Parts |
|---|---|
| $NH_4NO_3$ | 19.2 |
| $KNO_3$ | 11 |
| $(NH_4)_2HPO_4$ | 9 |
| $(NH_4)_2SO_4$ | 3 |
| $H_3PO_4$ | 3.7 |
| KCl | 0.8 |
| $K_2SO_4$ | 0.9 |
| $FeSO_4 \cdot 7H_2O$ | 0.044 |
| $H_3BO_3$ | 0.0308 |
| $NiCl_2 \cdot 6H_2O$ | 0.0027 |
| $ZnSO_4 \cdot 5H_2O$ | 0.0125 |
| $CuSO_4 \cdot 5H_2O$ | 0.015 |
| $CoCl_2 \cdot 6H_2O$ | 0.00072 |
| $H_2MoO_4 \cdot H_2O$ | 0.00081 |

Plants cultivated in this foam substrate manifested more rapid growth than plants which were grown in a substrate free from betaines and nutrient salts but which were supplied with liquid fertilizer at intervals. Substrates based on the foam described above but charged only with nutrient salts were also observed to give poorer results.

EXAMPLE 4

A foam is prepared from the following composition:

About 10 parts of a polyether propylene oxide initiated on ethylene diamine (OH number 630), about 10 parts of a polyether of ethylene oxide initiated on 1,1,1-trimethylolpropane (OH number 525), about 10 parts of a polyether of ethylene oxide and propylene oxide (20:80% by weight) initiated on 1,1,1-trimethylolpropane (OH number 42), about 10 parts of polyethylene glycol (OH number 148), about 5 parts of diethylene glycol (OH number 1060), about 2 parts of a hydroxyethylated oleic acid amide, about 2 parts of a polysiloxane stabilizer, about 25 parts of a solution of

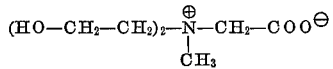

in water (1:1), about 5 parts of monofluorotrichloromethane and about 67 parts of a biuret polyisocyanate based on tolylene-2,4-diisocyanate and tolylene-2,6-diisocyanate (80:20% by weight) and having an NCO content of about 32.5%.

The density of the foam is about 12.6 kg./m.³.

In another reaction mixture, about 7 parts of the salt mixture having the composition specified in Example 3 were foamed in with the other components.

Plants cultivated in this foam substrate manifested more rapid growth than plants which were grown in a substrate not charged with betaines and nutrient salts but which were supplied with liquid fertilizer at intervals. The same observation of a poorer result was also made with substrates based on a foam of the same composition charged only with nutrient salts.

EXAMPLE 5

A foam is prepared from the following composition:

About 15 parts of a polyether of propylene oxide started on ethylene diamine (OH number 630), about 20 parts of a polyether of propylene oxide initiated on 1,1,1-trimethylolpropane (OH number 875), about 10 parts of a polyether of propylene oxide started on 1,1,1-trimethylolpropane (OH number 375), about 10 parts of diethylene glycol (OH number 1060), about 2 parts of a polysiloxane stabilizer, about 25 parts of solution of

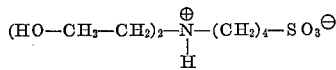

in water (2:3), about 9 parts of monofluorotrichloromethane and about 91 parts of a biuret polyisocyanate based on tolylene-2,4- and -2,6-diisocyanate (80:20% by weight) and having an NCO content of about 32.5%.

The density of the foam is about 11.3 kg./m.³.

In another reaction mixture, about 7 parts of the salt mixture of the composition specified in Example 3 were foamed in with the other components.

Plants cultivated in this foam substrate were distinguished by more rapid growth than plants which were grown in a similar substrate but without betaines and nutrient salts and which were supplied with liquid fertilizer at intervals. The same observation of a poorer result was also made on substrates based on the foam described above charged only with nutrient salts.

EXAMPLE 6

A foam is prepared in the same way as in Example 5 except that the betaine cross-linking agent used is about 10 parts of the compound:

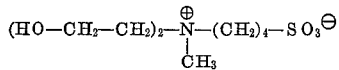

dissolved in about 17 parts of water. The density of the foam is about 11.8 kg./m.³. FIG. 6 shows that buffering capacity of the foam for acids and bases compared with that of a similar foam prepared without the addition of the above mentioned betaine. As expected, its buffering capacity is less than that of the foam in Example 5 (substitution of H on N by CH₃). A positive effect on plant growth was nevertheless observed when the substate was used in combination with fertilizer salts. For this purpose, another batch of the same foaming mixture was prepared with the addition of 7 parts of the salt mixture which has the composition specified in Example 3.

Plants cultivated in this foam substrate were distinguished by more rapid growth than plants which were grown in a substrate not charged with betaines and nutrient salts but which were supplied with liquid fertilizer at intervals. The same observation of a poorer result was also made on substrates based on the foam described above charged only with nutrient salts.

Although the invention is illustrated in considerable detail in the foregoing examples, it is to be understood that such detail is presented solely for purposes of illustration and that many variations may be made therein by one skilled in the art without departing from the spirit and scope of the invention.

What is claimed is:

1. In a process for the production of hydrophilic polyurethane foams which have a density of from about 6 to about 50 kg./m.³ comprising reacting compounds having a molecular weight of from about 100 to about 7,000 and containing at least two active hydrogen atoms with polyisocyanates and water and/or other blowing agents and if desired in the presence of activators, foam stabilizers and if desired other foaming aids, the improvement comprising carrying out said reaction in the presence of a betaine containing at least one group reactive with —NCO groups having the formula:

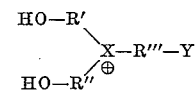

wherein

R represents hydrogen, $C_1$–$C_{18}$ alkyl radicals, $C_4$–$C_{14}$ cycloalkyl radicals, $C_7$–$C_{20}$ aralkyl radicals or $C_6$–$C_{14}$ aryl radicals;

R′, R″ represent the same or different divalent $C_2$–$C_{12}$ alkylene radicals, $C_4$–$C_{14}$ cycloalkylene radicals or $C_7$ to $C_{20}$ aralkylene radicals, any of which R′ and R″ radicals may be interrupted by ether oxygen atoms;

R‴ represents —CH₂—, divalent $C_2$–$C_{12}$ alkylene radicals, $C_4$–$C_{14}$ cycloalkylene radicals, or $C_7$ to $C_{20}$ aralkylene radicals, any of which R‴ radicals except —CH₂— can be interrupted by ether oxygen atoms;

X represents N or P; and

Y represents

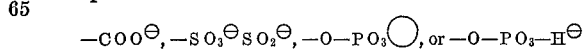

in an amount of from about 5% to about 100% by weight, based on the weight of compounds having a molecular weight of 100 to 7,000 and containing at least two active hydrogen atoms, the ratio of NCO groups to active hydrogen atoms being maintained between about 20:100 and about 90:100.

2. The process of Claim 1, wherein the betaines are dissolved in quantities of from about 10% to about 90% by weight, based on the compound having at least 2 active hydrogen atoms, in the water used as a blowing agent.

3. The process of Claim 1, wherein the betaines are dissolved in quantities of from about 10% to about 90% by weight, based on the compound having at least two active hydrogen atoms, in said compounds which contain at least two active hydrogen atoms.

4. The process of Claim 1, wherein from about 1% to about 30% by weight of plant nutrient salts are added to the foam reaction mixture either by dissolving them in the water used as a blowing agent or by making them up into a paste with the starting materials or by adding them to the reaction mixture just before or during the foaming process.

5. The process of Claim 1, wherein additional plant protective agents, plant hormones or growth substances in a liquid or solid form are foamed in with the other foam components.

6. Foam plastics suitable as substrates for the vegetative and generative propagation of plants prepared by the process of Claim 1.

References Cited

*Hackh's Chemical Dictionary;* 3rd edition; McGraw-Hill; New York, 1944, p. 124.

DONALD E. CZAJA, Primary Examiner

C. W. IVY, Assistant Examiner

U.S. Cl. X.R.

47—37, DIG. 1; 71—1, 27, 79, DIG. 1; 260—2.5 AM, 77.5 AQ; 77.5 AR, 77.5 Q

UNITED STATES PATENT AND TRADEMARK OFFICE
CERTIFICATE OF CORRECTION

PATENT NO. : 3,838,075

DATED : September 24, 1974

INVENTOR(S) : Werner Dietrich; Helmut Reiff; Karlheinz Andres; Johannes Niggemann and Ernst Roos It is certified that error appears in the above-identified patent and that said Letters Patent are hereby corrected as shown below:

Column 1, please correct the residence of "Johannes Niggemann" to --Leverkusen-- and "Ernst Roos" to --Cologne--;

Column 3, line 12, after the word "hydride" delete the period and insert a --,--.

Column 3, line 47, after the word "basicity" delete the period and insert --,--;

Column 3, line 73, "N.N" should be --N,N--;

Column 4, lines 30-33, " $-O-PO_3\bigcirc$ " should be -- $-O-PO_3^{2-}$ --;

Column 4, line 67, after the word "may" insert -- , --;

Column 6, line 46, after the words "butylene oxide" insert -- , --

Column 10, line 66, delete the formulae in their entirety and insert the following:

-- $-COO^{\ominus}$, $-SO_3^{\ominus}$, $SO_2^{\ominus}$, $-O-PO_3^{2-}$, or $-O-PO_3H^{\ominus}$ --.

Signed and Sealed this sixth Day of January 1976

[SEAL]

Attest:

RUTH C. MASON
Attesting Officer

C. MARSHALL DANN
Commissioner of Patents and Trademarks